United States Patent [19]
Fukuzawa et al.

[11] Patent Number: 4,973,129
[45] Date of Patent: Nov. 27, 1990

[54] OPTICAL FIBER ELEMENT

[75] Inventors: Takashi Fukuzawa, Sagamihara; Yoshihiko Hayashi, Tokyo; Takashi Kishimoto, Tsukuba; Yoichi Furuse, Tokyo; Sadao Kuzuwa, Sagamihara, all of Japan

[73] Assignee: Nippon Sheet Glass Co., Ltd., Osaka, Japan

[21] Appl. No.: 400,242

[22] Filed: Aug. 29, 1989

[30] Foreign Application Priority Data

Aug. 29, 1988 [JP] Japan ................... 63-214335
Jul. 9, 1989 [JP] Japan ................... 64-186301

[51] Int. Cl.⁵ .......................... G02B 6/22; G02B 6/10
[52] U.S. Cl. ............................ 350/96.33; 350/96.30
[58] Field of Search ............... 350/96.30, 96.31, 96.32, 350/96.33

[56] References Cited

U.S. PATENT DOCUMENTS 4,072,400  2/1978  Claypoole et al. .......... 350/96.33 X
4,482,204 11/1984  Blyler, Jr. et al. ......... 350/96.30 X
4,799,762  1/1989  Kakuta et al. ............. 350/96.30 X Primary Examiner—Akm Ullah
Attorney, Agent, or Firm—Herbert Dubno

[57] ABSTRACT

An optical fiber element includes a non-armored optical glass fiber element having a numerical aperture of 0.35 or more, and a resin layer obtaining by applying a resin composition to a surface of the non-armored optical glass fiber element in contact therewith and by curing the resin composition, the cured resin layer essentially consisting of the resin composition having a Shore D hardness value of 65 or more defined in the Japanese Industrial Standards (JIS) at room temperature.

7 Claims, 2 Drawing Sheets

OPTICAL FIBER ELEMENT

FIELD OF THE INVENTION

The present invention relates to an improvement of a coating structure of an optical fiber element and, more specifically, to a coating structure of an optical fiber element wherein terminal splicing work can be facilitated and the strength and reliability of a terminal portion can be improved.

BACKGROUND OF THE INVENTION

The mechanical strength of glass-based optical fibers is greatly decreased if scratches are formed on their surfaces. A resin is coated on the surface of a non-armored optical fiber element immediately after spinning to prevent the formation of scratches. A typical conventional coating structure is a double coating structure consisting- of a primary coating layer and a buffer layer formed on the primary coating layer.

A soft resin for primary coating layer having a JIS-A hardness value of 40 or less as specified in the Japanese Industrial Standards (JIS) is used to reduce an optical loss called a microbending loss.

Since glass-based optical fibers have a small core diameter, strict coupling precision is required to couple an optical fiber to a light source or an optical receiver. For this reason, when the end face of the optical fiber is processed, the primary coating layer made of the soft resin must be peeled from the optical fiber element to expose the surface of the non-armored optical fiber element, and high coupling precision must be maintained. Since a large force cannot be applied to the optical fiber element, connection by caulking which has been practiced for a conventional electric cable cannot be used to mount the optical fiber element to a metal member such as a connector. The optical fiber elements must be coupled to each other by an adhesive.

As described above, when an optical fiber element having a conventional coating structure is to be coupled to another component, the coatings must be peeled from the optical fiber elements and the optical fiber elements must be washed. Thereafter, an adhesive must be employed to seal a coupling portion and must be hardened, thus making the end splicing time consuming. In addition, when the buffer layer and the primary layer are peeled from the fiber element, the surface of the non-armored element tends to be damaged. In that case, the mechanical strength at the coupling portion is decreased, and hence the reliability of optical fibers is undesirably decreased.

Since a conventional coating material tends to easily peel from the glass, i.e., has weak adhesion to glass, when an optical fiber is fixed (caulked) the non-armored optical fiber element is undesirably displaced due to a temperature cycle or the like. As a result, the end of the non-armored optical fiber element extends at the terminal portion and collides with the coupled member, thus increasing the optical coupling loss at the terminal portion of the optical fiber.

OBJECTS OF THE INVENTION

It is an object of the present invention to provide an optical fiber element wherein splicing workability at the time of coupling of a terminal portion of an optical fiber to a connector or the like can be improved, and at the same time mechanical reliability at the terminal portion can be improved.

It is another object of the present invention to provide an optical fiber element with a jacket which does not easily peel from an optical fiber element.

SUMMARY OF THE INVENTION

In order to achieve the above objects of the present invention, there is provided an optical fiber element wherein a resin composition having a Shore D hardness value of 65 or more specified in the Japanese Industrial Standards (JIS) at room temperature upon curing is applied to a surface of a non-armored optical glass fiber element having a numerical aperture (NA) of 0.35 or more, and the resin composition is cured to form a jacket.

The material of the non-armored optical glass fiber used in the present invention is not limited to a specific one. However, a non-armored glass fiber element using compound glass is preferably used in the present invention since it generally has a wide NA adjustment range of about 0.2. to 0.5.

Examples of the resin composition used in the present invention are thermosetting resins and, ultraviolet curing resins. A preferable resin composition has a high curing rate and good adhesion strength with glass. When these properties are taken into consideration, a resin containing epoxy acrylate and/or urethane acrylate as a major constituent is most preferable. The Shore D hardness value of the jacket resin is limited to 65 or more due to the following reason. When the Shore D hardness value is less than 65, the optical fiber element cannot be firmly contact-bonded to a metal member such as a connector. Even if the optical fiber element can be bonded to the metal member, its contact bonding force cannot be increased. Therefore, axial displacement of the non-armored optical glass fiber element occurs to increase an optical coupling loss over allowable range.

The numerical aperture NA of the non-armored optical glass fiber element of interest is limited to 0.35 or more due to the following findings. If the NA value is smaller than 0.35, the optical loss (microbending loss) caused by microbending is increased upon covering the non-armored fiber element with a hard resin, thereby causing practical problems in optical communications. When the NA value is 0.35 or more, the microbending loss does not increase to cause no practical problems upon covering the non-armored fiber element with the hard resin.

With the structure of the present invention, since the primary coating layer (jacket) has a sufficiently high hardness and its diameter can be accurately controlled, the jacket need not be peeled from the optical fiber element at the time of terminal splicing. The optical fiber element with the coating can be contact-bonded to another component such as a connector, thereby facilitating a terminal splicing operation.

At the same time, since the surface of the glass fiber need not be exposed, a mechanically weak portion caused by a scratch or the like is not formed in the glass fiber, thereby improving reliability at the terminal portion.

Since a large fastening force can be applied to the optical fiber element at the time of contact bonding, strict control of the fastening force need not be considered. Also from this point of view, terminal splicing can be facilitated, and the range of selection of materials for contact-bonding members can be widened, thus allowing manufacturing of an optical fiber at low cost.

DETAILED DESCRIPTION OF THE PREFERRED EMBODIMENTS

Preferred embodiments of the present invention will be described in detail with reference to the accompanying drawings.

Figure 1:
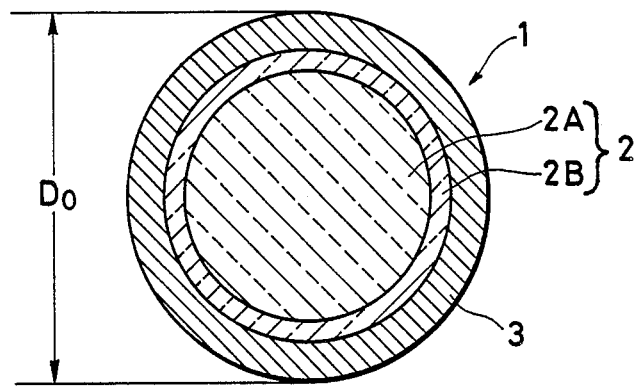
FIG. 1 is a cross-sectional view of an optical fiber element according to an embodiment of the present invention.

FIG. 1 shows a cross-section of an optical fiber element 1 according to the present invention. A jacket 3 made of a hard resin and having a uniform thickness is formed in tight contact with the surface of a non-armored optical fiber element 2 consisting of a compound glass core 2A and a cladding 2B to constitute the optical fiber element 1.

The non-armored optical fiber element 2 has a numerical aperture (NA) of 0.35 or more.

The jacket 3 is formed such that a resin composition having a Shore D hardness value of 65 as specified in the Japanese Industrial Standards (JIS) at room temperature after curing is applied to the surface of the non-armored optical fiber element 2 and the resin composition is then cured.

A diameter $D_0$ of the optical fiber element 1 varies depending on applications. When use of conventional optical fiber connectors without modifications is taken into consideration, the diameter $D_0$ preferably fits to that of the conventional non-armored optical fiber element.

For example, the diameter $D_0$ is set to be 300 μm, 250 μm, 230 μm, 140 μm, or 125 μm.

The abovementioned conventional double coating structure using a soft resin to form the primary coating has been used to minimize the optical loss (microbending loss) caused by microbending. The microbending loss is in inverse proportion to a power of six of the NA. The coating structure for optical communication fibers, clamping each sample by a clip of a 1.25 mm² copper determined in view of transmission reliability. According to the experimental results of the embodiments, however, no problem was occured when the NA value of an optical fiber was 0.35 or more.

In Example 1 an optical fiber element 1 was manufactured by applying a resin (referred to as a resin P1 hereinafter) having a Shore D hardness value of 83 to a non-armored compound glass optical fiber element 2 having NA=0.50 and a core diameter of 200 μm to a coating thickness of 15 μm.

In Comparative Example 1, an optical fiber element 1 was manufactured by applying the resin P1 as in Example 1 to a non-armored compound glass optical fiber element 2 having NA=0.28 and a core diameter of 200 μm to a coating thickness of 15 μm.

In Comparative Example 2, an optical fiber element having a double coating structure such as a conventional element was manufactured by applying a soft resin (to be referred to as a resin P2 hereinafter) to form a primary coating on a non-armored compound glass optical fiber element which has NA=0.28 and a core diameter of 200 μm. The primary coating resin P2 has a JIS-A hardness value of 10 and a thickness of 30 μm. The secondary coating has a Shore D hardness value of 40 and a thickness of 100 μm.

If a resin has a given Shore D hardness value, this resin has a higher JIS-A hardness value.

Three kinds of test were conducted for the above three optical fiber element samples under a simulated load condition which might be experienced in practical applications. In Test 1, an increase in optical loss of each sample was measured by applying a load of 4 kg to the side surface of each sample having a length of 100 mm. In Test 2, an increase in optical loss of each sample was measured by winding each sample around a mandrel having a diameter of 15 mm five times. In Test 3, an increase in optical loss was measured by urging each sample by a clip for a 1.25 mm² copper wire.

Test results are summarized in Table 1.

TABLE 1

| | Example 1 | Comparative Example 1 | Comparative Example 2 |
|---|---|---|---|
| | (unit: dB) | | |
| Test 1 | 0.02 | 0.31 | 0.02 |
| Test 2 | 0.02 | 0.85 | 0.60 |
| Test 3 | 0.03 | 1.04 | Non-measurable due to damage to fiber |
| NA | 0.50 | 0.28 | 0.28 |
| Coating | Hard resin (P1) | Hard resin (P1) | Conventional structure |

As is apparent from the results of Table 1, even in an optical fiber having a soft resin coating, the inverse proportionality to a power of six of the NA is confirmed to be established for the microbending loss within the NA range of 0.28 to 0.50.

Judging from the above relationship, if NA=0.35, increases in optical loss in Test 1 to Test 3 are obtained as follows. In the coating structure of the present invention, increases in optical loss are 0.08 to 0.16 dB in Test 1, 0.22 to 0.17 dB in Test 2, and 0.27 to 0.25 dB in Test 3.

The maximum limit of the microbending loss which is allowed in practical applications of optical communication fibers is about 0.3 dB. According to the structure of the present invention, it is confirmed that the microbending loss is within the above allowable range. In the structures of Comparative Examples 1 and 2, the increases in optical loss is over the allowable range, as is apparent from Table 1.

The hardness of the coating resin will be described in more detail.

A soft resin having a thickness of several tens of microns is applied to a conventional communication optical fiber. Since the resin is soft, the fiber is protected from scratches by increasing the thickness of the soft resin. Therefore, when terminal splicing is to be performed, contact-bonding through the jacket cannot be performed in practice, and fixing using an adhesive is required, thus resulting in a time-consuming operation. In addition, the resin layer must be peeled from the fiber element prior to fixing for coupling precision. When the resin layer is peeled from the fiber element, the non-armored optical fiber element is damaged, thus greatly decreasing the strength and degrading the reliability.

According to the extensive studies by the present inventors, the optical fiber element obtained by applying a resin having a Shore D hardness value of 65 or more in contact with the surface of the non-armored optical fiber element allowed contact-bonding through the jacket. A sufficient strength could be maintained in practical applications.

An experiment for confirming the above will be described below.

In Example 2, an optical fiber element 1 was prepared by covering a resin (to be referred to as a resin P3) having a Shore D hardness value of 75 and a thickness of 20 μm. In Example 3, an optical fiber element 1 was prepared by covering a resin (to be referred to as a resin P4) having a Shore D hardness value of 77 and a thickness of 15 μm.

In Comparative Example 3, an optical fiber element having a double coating structure was obtained such that a soft resin P2 having a thickness of 30 μm was used as a primary coating and a silicone resin having a thickness of 100 μm and a JIS-A hardness value of 40 was used as a secondary coating.

The following tests were conducted for the respective optical fiber element samples. More specifically, in Test 4, both ends of each sample were clamped by clips for a 1.25 mm² copper wire through the coating of each sample. Both the clamped portions were held to pull the sample to measure a tensile strength. In Test 5, both end portions of the fiber of Comparative Example 3 were peeled from the fiber element and the peeled end portions are clamped by clips for a 1.25 mm² copper wire and the fiber sample was pulled to measure a tensile strength.

Test results are summarized in Table 2.

TABLE 2

(unit: kg)

| Test 4 | | | | Test 5 |
|---|---|---|---|---|
| Example 1 | Example 2 | Example 3 | Comparative Example 3 | Comparative Example 3 |
| 2.48 | 2.78 | 2.28 | 0.64 | 0.78 |

When an optical fiber communication line is arranged, a tension member such as Kevlar fibers is generally arranged around the optical fiber element, and the end of the tension member is fixed to a connector member, thereby causing the tension member to receive the load acting on the fiber in its longitudinal direction upon installation. Therefore, the tensile strength required for the optical fiber element is such that the optical fiber element can withstand the load acting on the end portion of the optical fiber element at the time of splicing of the element to the connector member. The tensile strength of the optical fiber element is sufficient in practical applications when it is 1 kg or more.

As is apparent from Table 2, the optical fiber element having the structure of the present invention has a sufficient tensile strength in practical applications.

The materials of the resins P1 to P4 used in the experiments exhibiting the results in Tables 1 and 2 are as follows.

Resin P1

Major component: Epoxy acrylate resin Dicklight UE-8070-40BH (tradename) available from DAINIPPON INK & CHEMICALS, INC.

Minor component: GE-610 (tradename) available from MITSUBISHI GAS CHEMICAL CO., INC.

Curing agent: Perchble Z (tradename) available from NIPPON OIL & FATS CO., LTD.

Lubricant: Y-7006 (tradename) available from NIPPON UNITIKA K.K.

Resin P2

Silicone resin XE14-128 (tradename) available from Toshiba Silicone K.K.

Resin P3

Silicone resin OF-20 (tradename) available from Shin-Etsu Chemical Co., Ltd.

Resin P4

Major component: Epoxy acrylate resin UE-EXP-247-60HP (tradename) available from DAINIPPON INK & CHEMICALS, INC.

Minor component: GE-650 (tradename) available from MITSUBISHI GAS CHEMICAL CO., INC.

Curing agent: Pertible Z (tradename) available from NIPPON OIL & FATS CO., LTD.

Lubricant: Y-7006 (tradename) available from NIPPON UNITIKA K.K.

Figure 2:
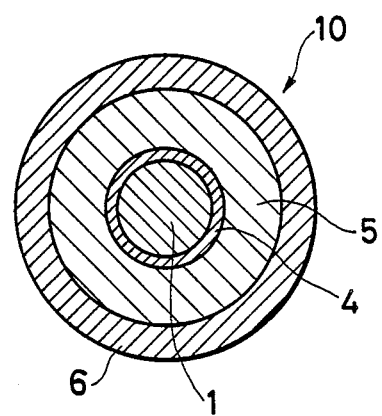
FIG. 2 is a cross-sectional view showing a structure of an optical fiber cord using the optical fiber element shown in FIG. 1.

A cross-sectional structure of an optical fiber cord using the optical fiber element shown in FIG. 1 is illustrated in FIG. 2.

In a fiber cord 10, a protective tube 4 is fitted on the optical fiber element 1, a tension member made of Kevlar fibers is fitted on the protective tube 4, and a sheath 6 made of vinyl chloride resin or the like is fitted on the tension member 5.

Figure 3:
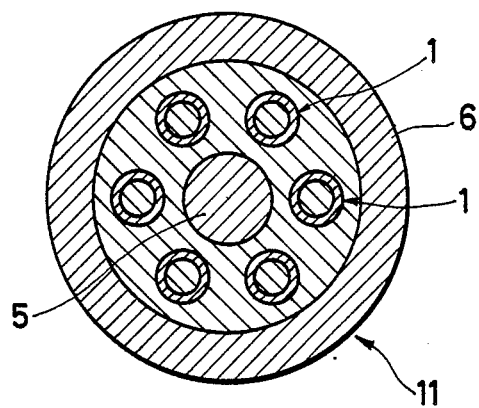
FIG. 3 is a cross-sectional view showing a structure of an optical fiber cable using the optical fiber elements shown in FIG. 1.

FIG. 3 shows a cross-sectional structure of an optical cable using the optical fiber elements 1 shown in FIG. 1. In this optical cable 11, a tension member 5 is located at the center of the cable 11, and a proper number of optical fiber elements 1 associated with the present invention are arranged around the central tension member 5. The resultant structure is then covered with a sheath 6.

Figure 4:
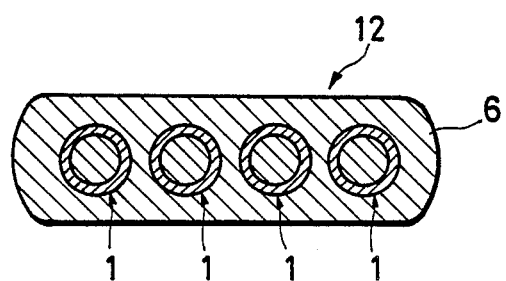
FIG. 4 is a cross-sectional view showing a structure of a tape-like core cable using the optical fiber elements shown in FIG. 1.

In an embodiment shown in FIG. 4, a proper number of optical fiber elements 1 of the present invention are aligned in line and are covered with a sheath 6 made of a resin such as urethane acrylate, thereby constituting a tape-like core cable 12.

Typical embodiments of the present invention are exemplified. The present invention is intended to improve the structure of the optical fiber element. The present invention does not restrict the kind of members such as a secondary coating for covering the optical fiber element.

In a optical fiber element according to the present invention, when a terminal portion of an optical fiber is coupled to a connector or the like, peeling and washing of the primary coating layer need not be performed as the conventional fiber element. In addition, the fiber element according to the present invention can be fixed by contact bonding, so that the splicing operation can be facilitated. Since the coating need not be peeled at the terminal portion during splicing, a mechanically weak portion is not formed in the glass fiber portion, thereby improving reliability at the terminal portion.

Since the jacket is hard and can be firmly adhered to the surface of the non-armored optical fiber element without considering the peeling tendency of the jacket, fixing of the jacket enables to fix the non-armored optical fiber element.

What is claimed is:

1. An optical fiber element comprising:

a non-armored optical glass fiber element having a numerical aperture of not less than 0.35; and a cured resin layer obtaining by applying a resin composition to a surface of the non-armored optical glass fiber element in contact therewith and by curing the resin composition, the cured resin layer essentially consisting of the resin composition having a Shore D hardness value of not less than 65 specified in the Japanese Industrial Standards (JIS) at room temperature.

2. An element in accordance with claim 1, wherein the non-armored optical glass fiber element essentially consists of compound glass.

3. An element in accordance with claim 1, wherein the resin composition is a thermosetting or ultraviolet curing resin composition.

4. An element in accordance with claim 3, wherein the resin composition contains at least one substance selected from the group which consist of epoxy acrylate and urethane acrylate as a major component.

5. An element in accordance with claim 1, wherein the resin layer has a thickness of not less than 10 $\mu$m.

6. An element in accordance with claim 5, wherein the resin layer has a thickness of not less than 15 $\mu$m.

7. An element in accordance with claim 5, wherein the resin layer has a thickness of not less than 20 $\mu$m.

* * * * *